United States Patent
Emberling et al.

(10) Patent No.: US 6,906,720 B2
(45) Date of Patent: Jun. 14, 2005

(54) MULTIPURPOSE MEMORY SYSTEM FOR USE IN A GRAPHICS SYSTEM

(75) Inventors: Brian D. Emberling, San Mateo, CA (US); Michael G. Lavelle, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 292 days.

(21) Appl. No.: 10/096,065

(22) Filed: Mar. 12, 2002

(65) Prior Publication Data

US 2003/0174136 A1 Sep. 18, 2003

(51) Int. Cl.[7] .......................... G09G 5/39; G06F 12/02
(52) U.S. Cl. ...................... 345/531; 345/543; 345/545; 345/552; 345/533
(58) Field of Search ................... 345/501, 503, 345/531, 533, 536, 541, 543, 545, 552, 564

(56) References Cited

U.S. PATENT DOCUMENTS

| | | | | |
|---|---|---|---|---|
| 5,740,409 A | * | 4/1998 | Deering | 345/503 |
| 5,757,386 A | * | 5/1998 | Celi et al. | 345/548 |
| 5,987,582 A | * | 11/1999 | Devic | 345/543 |
| 6,104,417 A | * | 8/2000 | Nielsen et al. | 345/542 |
| 6,104,418 A | * | 8/2000 | Tanaka et al. | 345/531 |
| 6,288,729 B1 | * | 9/2001 | Laksono et al. | 345/520 |
| 6,317,134 B1 | * | 11/2001 | Hagemark et al. | 345/542 |
| 6,348,919 B1 | * | 2/2002 | Murphy | 345/421 |
| 6,362,824 B1 | * | 3/2002 | Thayer | 345/503 |
| 6,396,502 B1 | | 5/2002 | Cunniff | |
| 6,457,034 B1 | | 9/2002 | Morein | |
| 6,532,018 B1 | * | 3/2003 | Chen et al. | 345/519 |
| 6,567,091 B2 | * | 5/2003 | Dye et al. | 345/501 |
| 6,608,625 B1 | * | 8/2003 | Chin et al. | 345/501 |
| 6,756,978 B1 | * | 6/2004 | Chen et al. | 345/419 |
| 2002/0082081 A1 | * | 6/2002 | Takeuchi | 463/32 |
| 2003/0063087 A1 | * | 4/2003 | Doyle et al. | 345/422 |

\* cited by examiner

*Primary Examiner*—Ulka J. Chauhan
(74) *Attorney, Agent, or Firm*—Meyertons Hood Kivlin Kowert & Goetzel, P.C.; Jeffrey C. Hood

(57) ABSTRACT

A graphics system may include a frame buffer, a processing device coupled to output data, a multipurpose memory device that includes a plurality of storage locations and is coupled to store data output from the processing device, and a multipurpose memory controller coupled to the multipurpose memory device. The multipurpose memory controller may be configured to allocate a first plurality of the storage locations to a first image buffer configured to store image data, a second plurality of the storage locations to a first texture buffer configured to store texture data, and a third plurality of the storage locations to a first accumulation buffer configured to store accumulation buffer data. The multipurpose memory device may be configured to include a first image buffer, a first texture buffer, and a first accumulation buffer at the same time.

17 Claims, 10 Drawing Sheets

FIG. 10A

| Owning Process 902 | Base Address 904 | Size 906 | Type of Buffer 908 |

| Descriptor # 910 | Owning Process 902 | Base Address 904 | Size 906 | Type of Buffer 908 |

← 900B

MULTIPURPOSE MEMORY SYSTEM FOR USE IN A GRAPHICS SYSTEM

BACKGROUND OF THE INVENTION

1. Field of the Invention

This invention relates generally to the field of computer graphics and, more particularly, to memory devices used in computer graphics systems.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors rather than simple translators. This change is due to the recent increase in both the complexity and amount of data being sent to the display device. For example, modern computer displays have many more pixels, greater color depth, and are able to display more complex images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating, "draw a box at these coordinates." The graphics system then draws the box, freeing the processor to perform other tasks.

Generally, a graphics system in a computer is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphics applications, and especially multimedia applications, has made high performance graphics systems a common feature in many new computer systems. Most computer manufacturers now bundle a high performance graphics system with their computing systems.

Typically, a graphics system includes a frame buffer memory device that stores data to be output to a display. Frame buffers may be double-buffered so that data can be written into one buffer and read from the other buffer. Thus, the data may be rendered into one buffer while the data in the other buffer is being displayed. In addition to the frame buffer, some graphics systems include a texture memory device that stores texture data (e.g., groups of texels (texture elements) that make up a particular texture). Graphics systems may have additional memory needs. For example, graphics systems may need an accumulation buffer in which to store data before combining that data with other data. Some graphics systems use the system memory as an accumulation buffer. These systems may incur significant performance penalties since operations that use the accumulation buffer have to access the system memory over the system bus. In order to avoid the disadvantages of using the system memory as an accumulation buffer, some systems use a portion of the frame buffer for an accumulation buffer for rendering operations. As a result, these systems have a reduced effective frame buffer size. Additionally, these systems may have lower performance and precision for accumulation buffer operations than is desirable.

SUMMARY OF THE INVENTION

Various embodiments of a multipurpose memory device for use in a graphics system are disclosed. In one embodiment, a graphics system may include a frame buffer configured to store data, a processing device coupled to output data, a multipurpose memory device that includes a plurality of storage locations and is coupled to store data output from the processing device, and a multipurpose memory controller coupled to the multipurpose memory device. The multipurpose memory controller may be configured to allocate a first plurality of the storage locations to a first image buffer configured to store image data, a second plurality of the storage locations to a first texture buffer configured to store texture data, and a third plurality of the storage locations to a first accumulation buffer configured to store accumulation buffer data. The multipurpose memory device may be configured to include a first image buffer, a first texture buffer, and a first accumulation buffer at the same time.

In another embodiment, a graphics system may include a frame buffer configured to store data, a processing device coupled to the frame buffer, a multipurpose memory coupled to store data output from the processing device, and a memory controller coupled to the multipurpose memory and configured to dynamically allocate various different types of buffers such as texture buffers within the multipurpose memory. The memory controller may be configured to dynamically vary an amount of the multipurpose memory allocated to each type of buffer.

In some embodiments, a graphics system may include a frame buffer, a multipurpose memory device coupled to provide data to and to receive data from the frame buffer, and a memory controller coupled to the multipurpose memory device and configured to allocate a plurality of types of buffers in the multipurpose memory device. The memory controller may be configured to allocate a first type of buffer that is configured to store accumulation buffer data. The memory controller may also be configured to allocate a second type of buffer to store texture data in tiles. Addresses in the second type of buffer may be generated so that neighboring tiles are stored in different sets of banks in the multipurpose memory device. The multipurpose memory device may be configured to include the first type of buffer and the second type of buffer the same time.

BRIEF DESCRIPTION OF THE DRAWINGS

A better understanding of the present invention can be obtained when the following detailed description is considered in conjunction with the following drawings, in which:

FIGS. 10A–10B show buffer descriptors that may be used in various embodiments.

Figure 1:
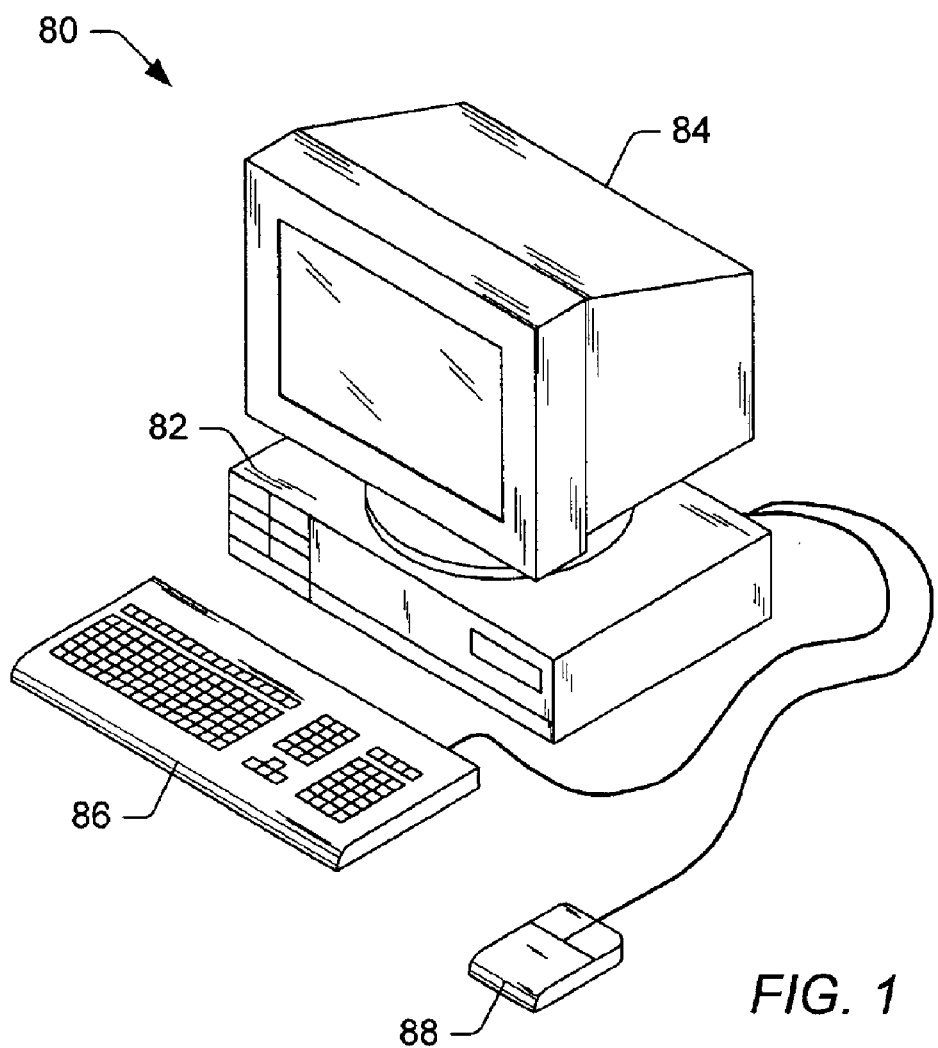
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF EMBODIMENTS
Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices that display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
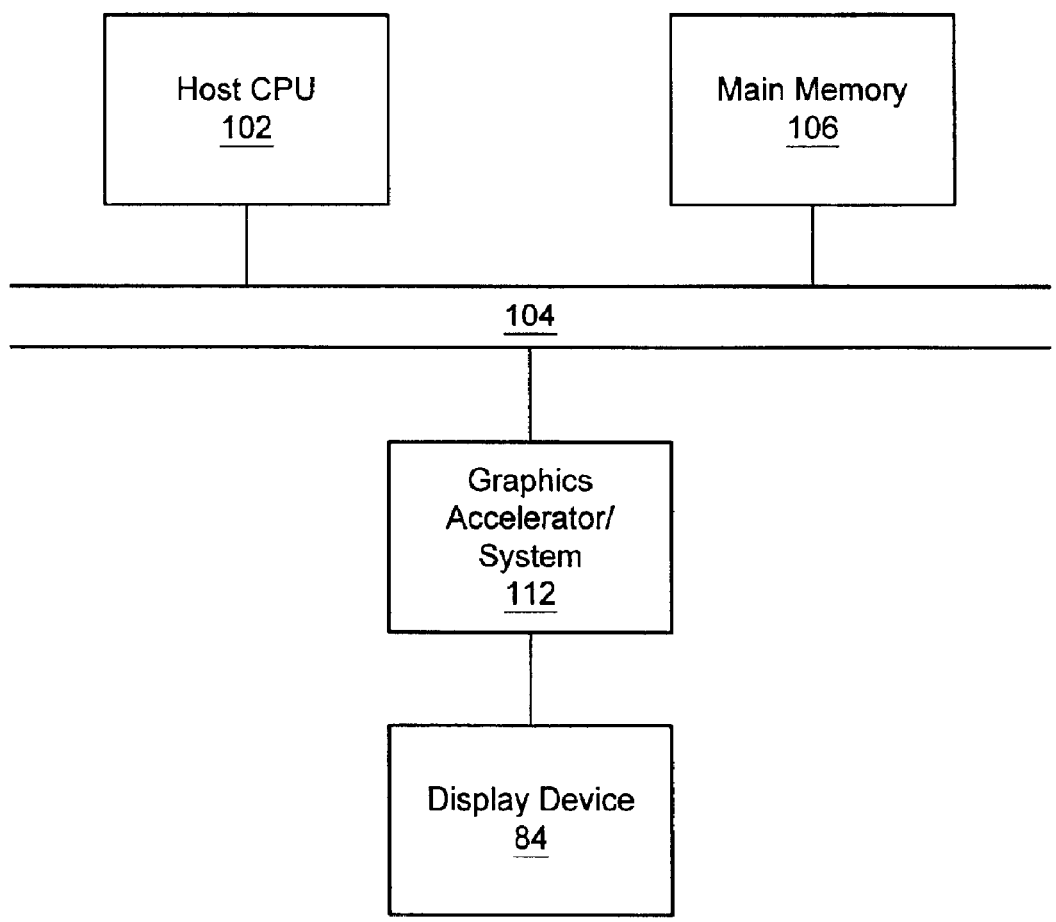
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g., the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
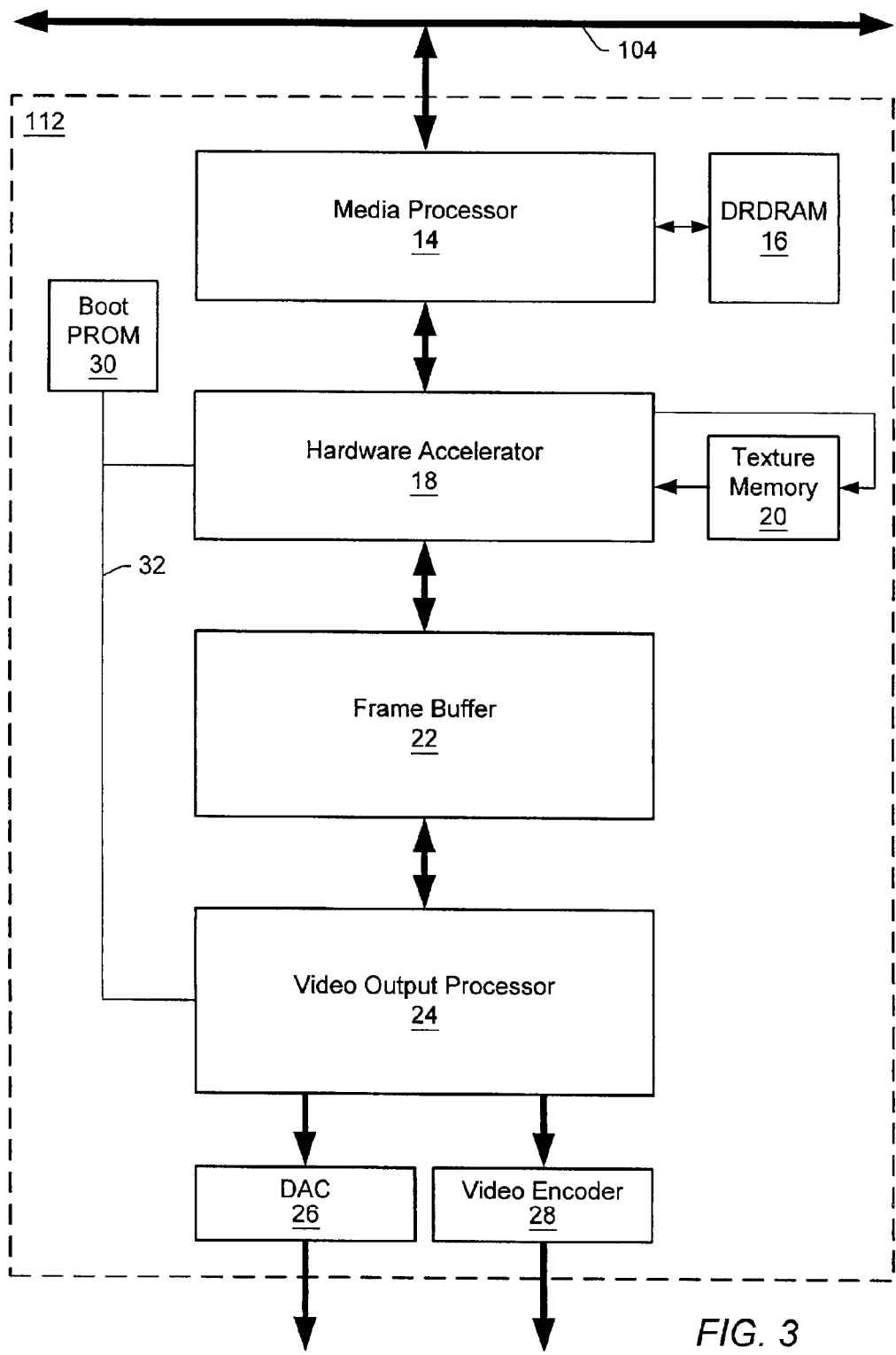
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
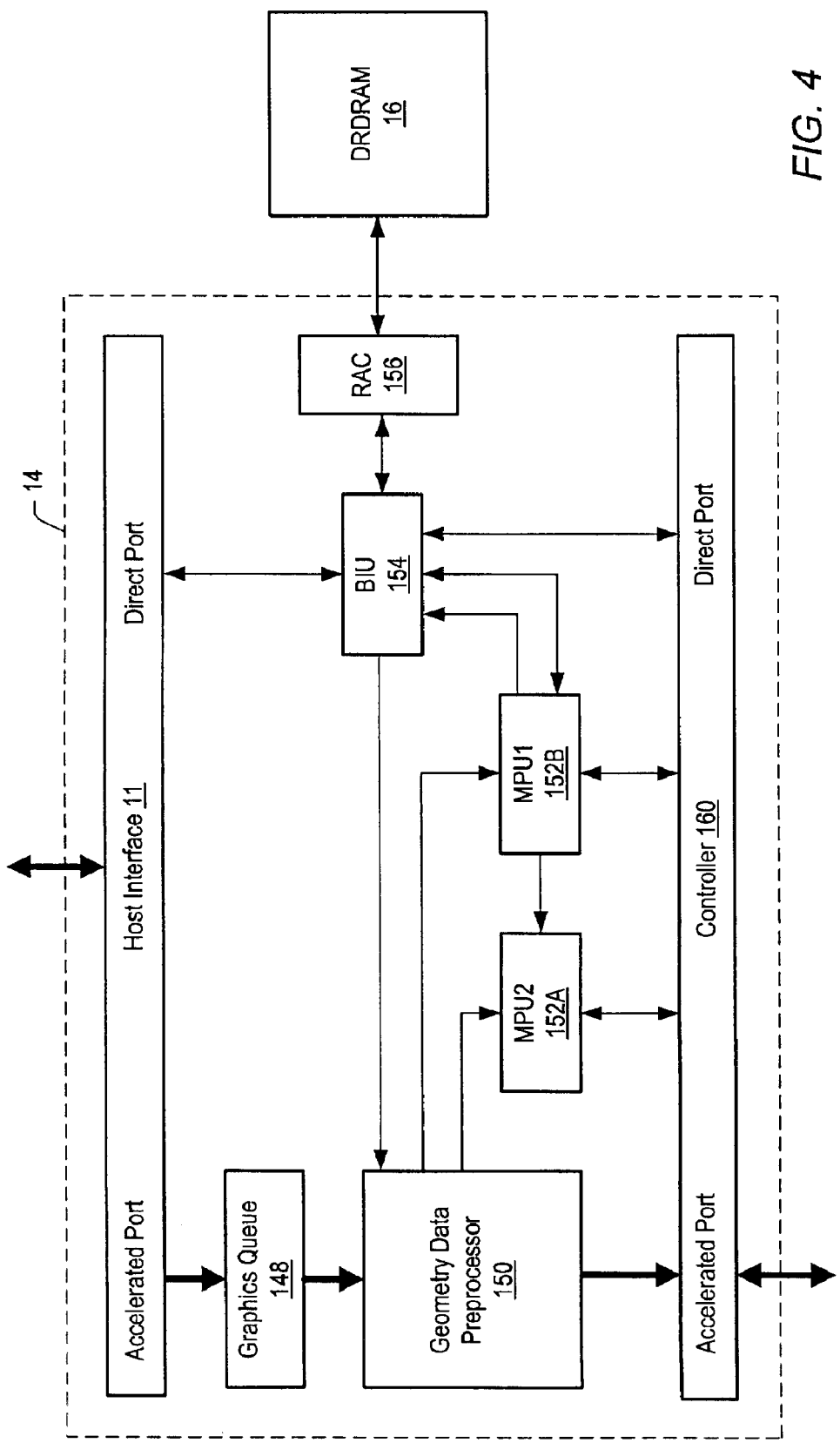
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g., stretching or shrinking), rotation, reflection, or combinations thereof. More generally, transformation may include linear mappings (e.g., matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e., the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
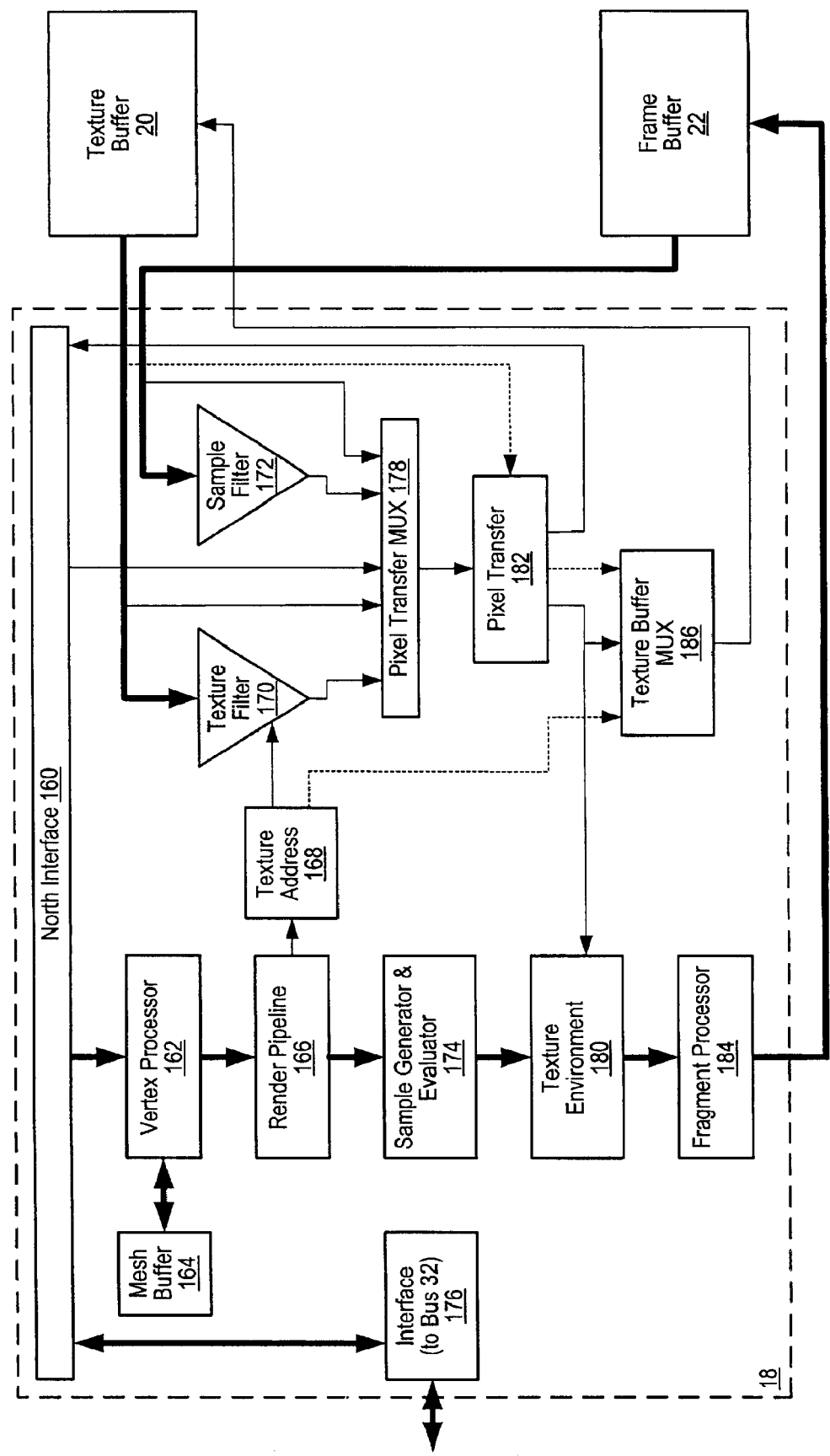
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);
r2, g2, b2 (i.e., red, green, and blue specular color from lit textures);
alpha (i.e., transparency);
z (i.e., depth); and
s, t, r, and w (i.e., texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may also scale and bias and/or lookup texels. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

In one embodiment, texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
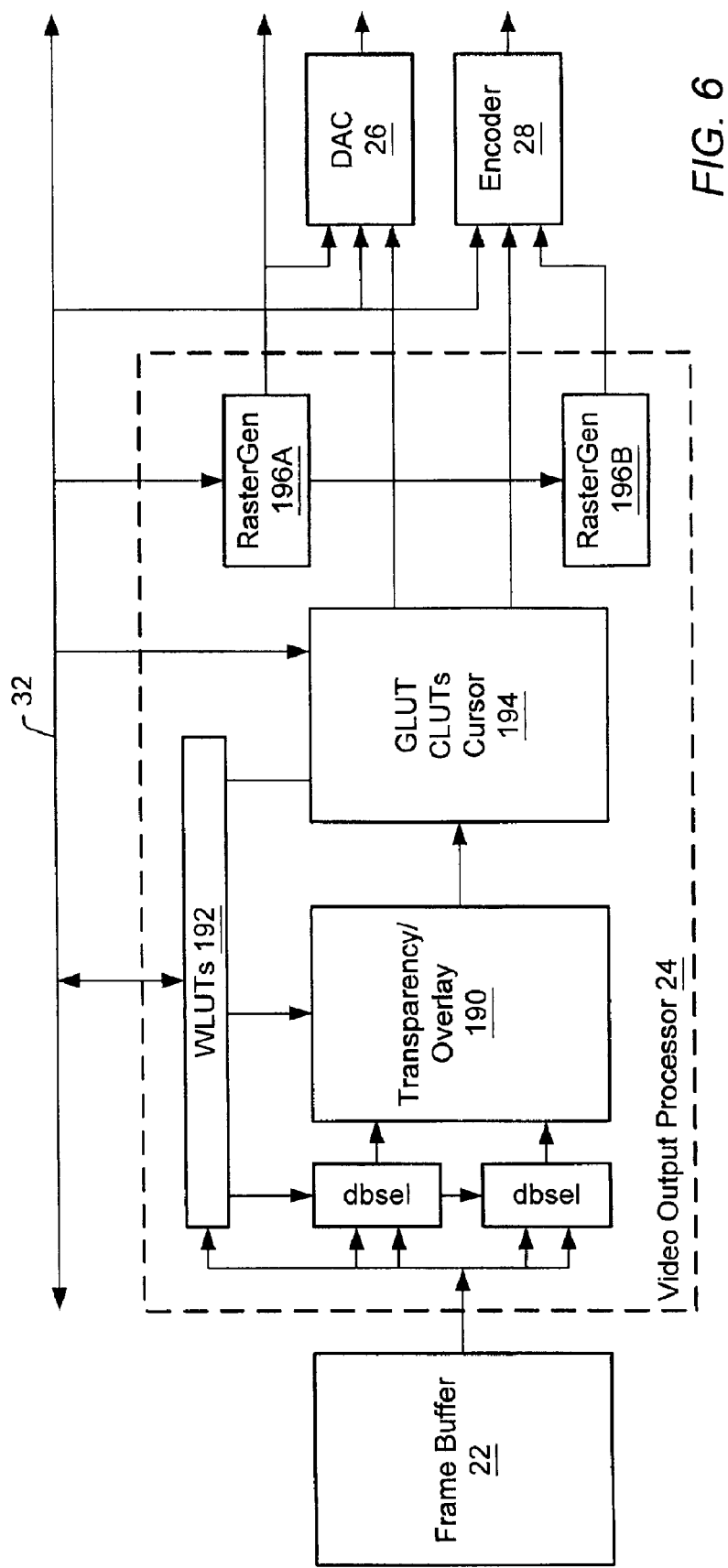
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Figure 7:
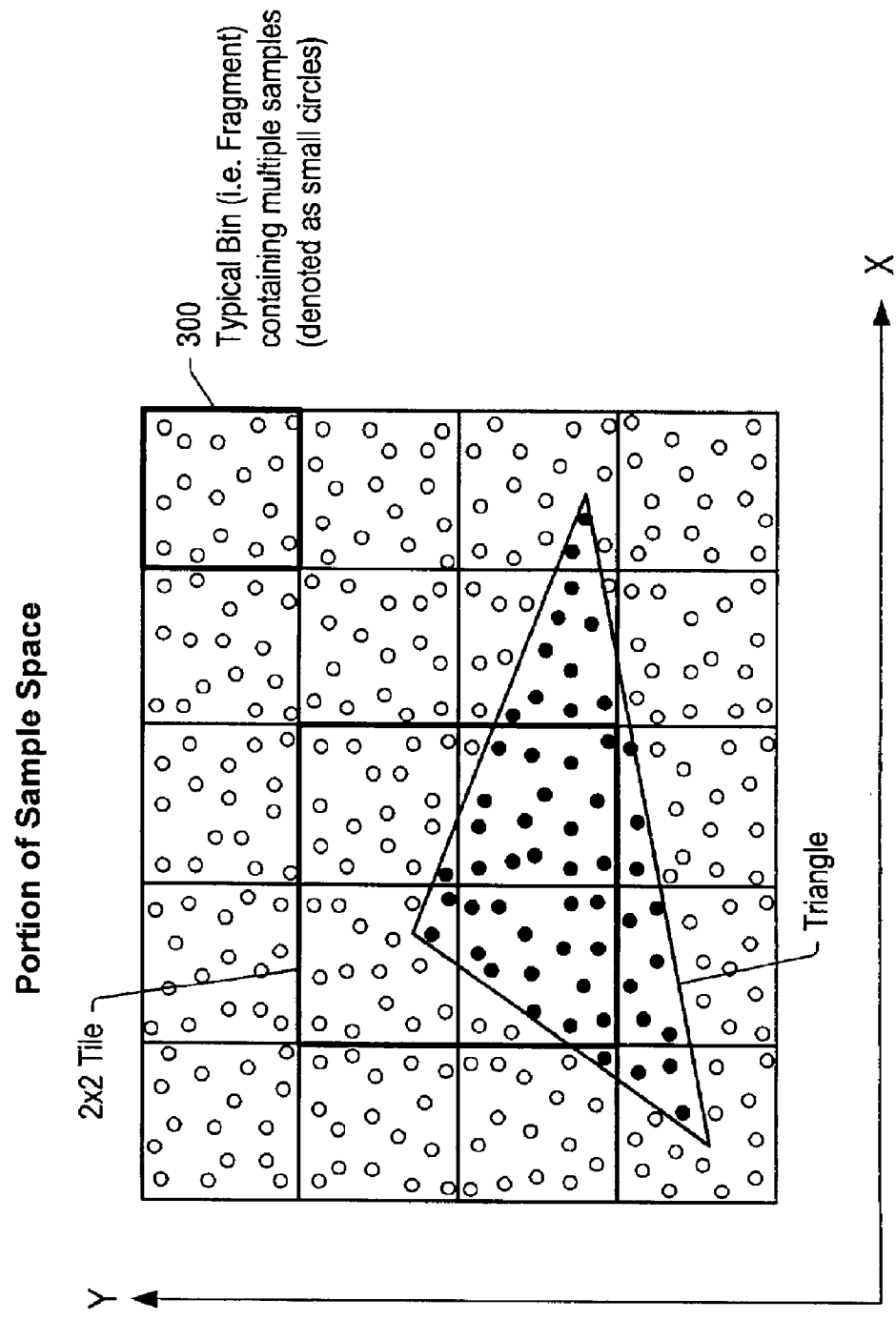
FIG. 7 shows how samples may be organized into bins in one embodiment.

Sample-to-Pixel Processing Flow—FIG. 7

In some embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g., monitors, projectors, head-mounted displays, and so forth) through DAC 26 and/or video encoder 28.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g., bin 300) as illustrated in FIG. 7. Each bin may contain one or more samples. The number of samples per bin may be a programmable parameter.

Multipurpose Memory Device

Figure 8:
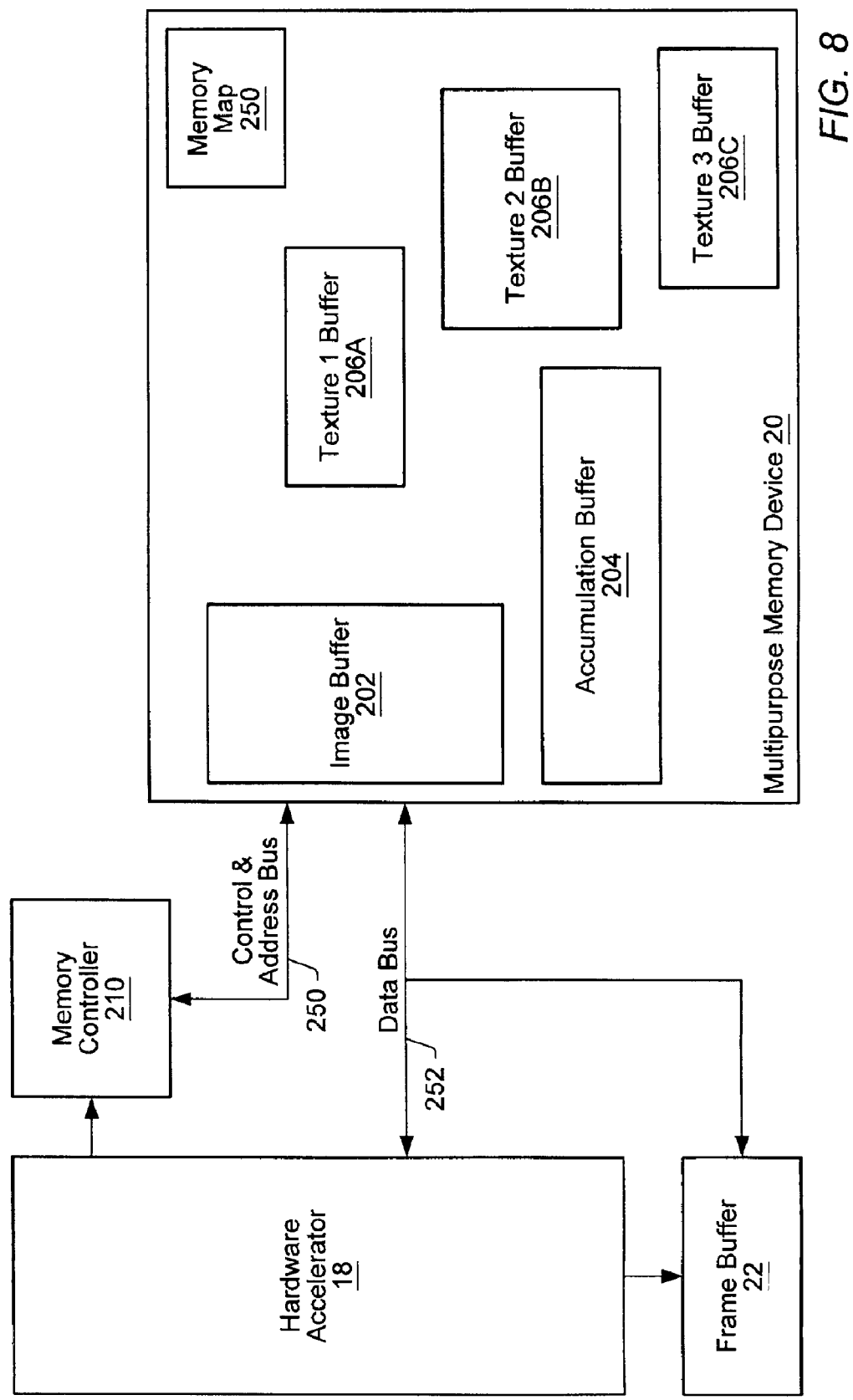
FIG. 8 shows one embodiment of a graphics system that includes a multipurpose memory device.

A graphics system such as the one illustrated in FIGS. 1–7 may include a multipurpose memory device that is configurable as a texture buffer, an image buffer, and/or an accumulation buffer (e.g., texture buffer 20). FIG. 8 shows one embodiment of a graphics system that includes a multipurpose memory device 20. In this embodiment, the multipurpose memory device 20 is coupled to a frame buffer 22 and a hardware accelerator 18 by a data bus 252. The hardware accelerator 18 accesses the multipurpose memory device 20 via a memory controller 210, which provides control and/or address signals to the multipurpose memory device 20. The multipurpose memory device 20 may include several memory devices (e.g., multiple SDRAM chips).

In this example, the multipurpose memory device 20 allocates different buffers to store different types of data: image data, texture data, and accumulation buffer data. In other embodiments, additional (or fewer) types of buffers may be supported. Each type of data is stored in a different type of buffer that is organized in a unique manner for that type of data. For example, each different type of buffer may store data that has a different data resolution (e.g., bits per pixel or sample) than data stored in other types of buffers. Similarly, each type of buffer may employ a unique interleaving pattern, address scrambling technique, data packing technique, etc. A first texture buffer 206A allocated in multipurpose memory device 20 stores texture data defining Texture 1, a second texture buffer 206B stores texture data defining Texture 2, and a third texture buffer 206C stores texture data defining Texture 3 (texture buffers 206A–206C are collectively referred to as texture buffers 206). An image buffer 202 allocated within the multipurpose memory device 20 stores image data. An accumulation buffer 204 allocated in the multipurpose memory device 20 stores accumulation buffer data. Each of these types of buffers (as well as other types of buffers in some embodiments) may be allocated in the multipurpose memory device 20 at a given time. In one embodiment, one buffer may be active (e.g., accessible by hardware accelerator 18) at a given time.

Buffers 202–206 may be allocated with arbitrary sizes. In some embodiments, there may be maximum and/or minimum sizes of buffers. These size limits may vary for different types of buffers.

Image data may be transferred to an image buffer 202 from system memory 106. Image data may include pixel data for pixels in a frame or portion of a frame. As the image data is transferred to the image buffer 202, it may be processed by a graphics system (e.g., by a media processor 14 and/or a hardware accelerator 18). After the image data is stored in the image buffer 202, it may be read out of the image buffer 202, passed through various filters and other processing units (e.g., in hardware accelerator 18). After this processing, the image data may be rewritten to the image buffer 202 or the frame buffer 22. This process may be repeated several times before a final version of the image data is stored in the frame buffer 22. After the process has completed, the image buffer 202 may be deallocated.

The image buffer 202 may be configured to store high-resolution pixel data (e.g., 8 bytes per pixel) in scanline order. The image buffer 202 may be interleaved so that neighboring groups of pixels in the same scanline can be read out in parallel in some embodiments. Data within an image buffer 202 may be accessed horizontally or vertically in one embodiment. In such an embodiment, the image buffer 202 may also be interleaved so that neighboring groups of pixels in the same vertical screen column may be read out in parallel.

Accumulation buffer data may be stored in an accumulation buffer 204 after being read from the frame buffer 22 and processed (e.g., in hardware accelerator 18). Accumulation buffer data may subsequently be read out of an accumulation buffer 204, processed in hardware accelerator 18, and written into the frame buffer 22. Accumulation buffer data may also be read from the frame buffer 22, processed in hardware accelerator 18, and stored into the accumulation buffer 204. Similar to image buffers 202, accumulation buffers 204 may be configured to store accumulation data in scanline order. However, accumulation data may be lower resolution data than the image buffer data in some embodiments. Accumulation buffer data may also be signed in some embodiments. Like an image buffer 202, an accumulation buffer 204 may be interleaved so that neighboring groups of pixels in the same scanline can be read out in parallel. Having an accumulation buffer 204 that is not part of the frame buffer 22 may allow accumulation operations to be performed without using the frame buffer 22 as both a data source and a data destination for the same operation.

For example, accumulation buffer data may include 48 bits per pixel in one embodiment. In such an embodiment, an accumulation buffer may be treated as a block of memory of size BufferSize (in pixels)*6 bytes. The memory controller 210 may pack pixels into bus blocks sized to take advantage of the available width of the data bus 252 (e.g., 6-byte pixels may be packed into 16-byte memory blocks for transmission on a 16-byte data bus 252.

Texture data defining a texture (e.g., in terms of texels) may be written to a texture buffer 206 from system memory 106. The texture data may be accessed during rendering (e.g., by hardware accelerator 18) so that the texture may be applied to a surface. Texture data may be interleaved so that neighboring texels can be read out in parallel. Texture data may be in non-scanline order within a texture buffer 206. A rendering process that accesses a first texel may next access a neighboring texel in an arbitrary direction from the first texel. Accordingly, address scrambling may be used so that the texture data is stored within a texture buffer 206 in a way that may increase the number of neighboring texels in an arbitrary direction that may be accessed in a given number of memory access cycles. For example, texels may be stored in tiles (or pages) so that neighboring texels are in the same tile. To reduce tile-switching penalties (e.g., the latency incurred when switching between tiles stored in the same memory bank), neighboring tiles may be stored in different banks (or groups of banks) in the multipurpose memory device 20 in some embodiments.

A multipurpose memory device 20 may be configured to allocate different amounts of memory to different types of buffers. For example, if an application uses a large amount of texture buffer memory but little or no image buffer memory, the multipurpose memory device 20 may allocate more memory to texture buffers 206 than to image buffers 202. The same multipurpose memory device 20 may be configured to allocate more image buffers 202 than texture buffers 206 for applications that use more image buffer memory than texture buffer memory.

Figure 9:
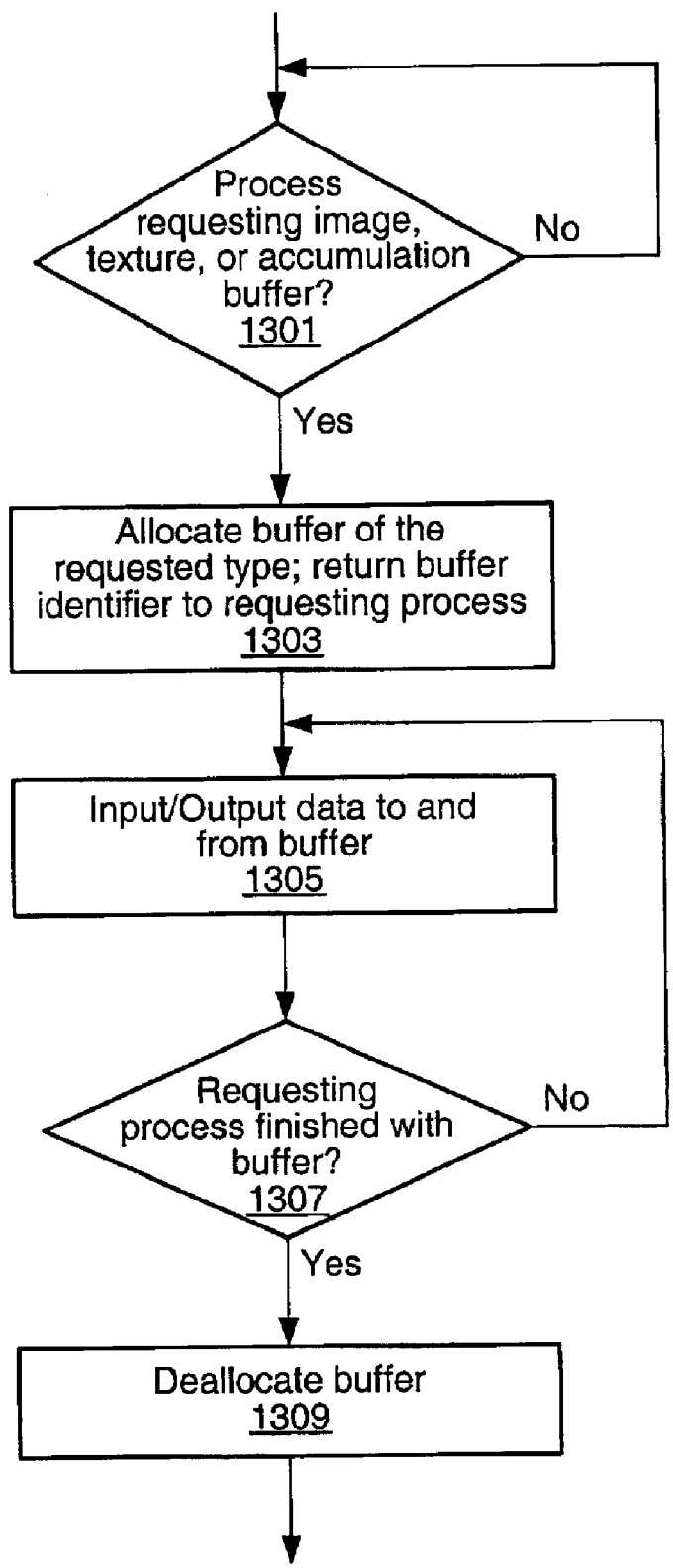
FIG. 9 shows one embodiment of a method of allocating and deallocating buffers in a multipurpose memory device.

FIG. 9 shows one embodiment of a method of allocating and deallocating buffers in a multipurpose memory device 20. Buffers such as 202, 204 and 206 may be allocated in response to a software process requesting a buffer to perform a graphics processing function, as shown at 1301 and 1303. Such software may be executed by a processor 102 and stored in a memory (e.g., system memory 106). The requesting application may indicate the size and type of the requested buffer. The type of buffer indicates what type of data that buffer will be storing and/or how that buffer should be organized. For example, an application program may provide a texture definition to a device driver associated with the graphics system. The application program may later provide graphics primitives to the graphics system and request that the texture be applied to all or part of the primitives. In response, a device driver may allocate a texture buffer to store the texture (e.g., by sending commands to the memory controller 210). The device driver may then return an indication (e.g., a base address or a descriptor ID) of the allocated buffer to the requesting application program, as indicated at 1303.

The requesting application program may use the returned indication to access the buffer, at 1305. For example, the memory controller 210 may receive requests (e.g., from hardware accelerator 18) to access data stored at a given address within the buffer. The buffer may be deallocated in response to the requesting process indicating that it has finished with the buffer (e.g., by sending an indication to a device driver), as shown at 1307 and 1309.

In some embodiments, a multipurpose memory device 20 may be managed in software. For example, when an application program requests a buffer (e.g., image, texture, or accumulation), a device driver may send a command to the memory controller 210 to allocate a buffer of the requested type and size at a particular base address (e.g., 1 Mb at address 4K). The device driver may also return an indication identifying the allocated buffer (e.g., an indication of the base address of the allocated buffer) to the requesting application program. The software application may track which buffers are currently allocated in a memory map (e.g., system memory 106) that stores a descriptor. FIG. 10A shows one embodiment of a descriptor 900A that may be stored for each allocated buffer. Each descriptor 900A may identify the owning (requesting) process 902, the base address 904 of the buffer, the size 906 of the buffer, and the type 908 of the buffer. In an embodiment where software (e.g., a device driver) manages the multipurpose memory device 20, multipurpose memory device 20 may not be configured to store a memory map 250 indicating which buffers are currently allocated.

In alternative embodiments, a multipurpose memory device 20 may be managed in hardware. For example, a portion of the multipurpose memory device 20 may be allocated to store a memory map 250 identifying the currently allocated buffers. The memory map 250 may be implemented as a linked list of descriptors. FIG. 10B shows an exemplary descriptor 900B that identifies a descriptor ID 910, the owning (requesting) process 902, the base address 904 of the buffer, the size 906 of the buffer, and the type 908 of the buffer. Each descriptor 900B may be initialized when an application program, requests memory. In response to the request, a software program (e.g., a device driver) may initialize a descriptor 900B for the process and return a descriptor ID 910 identifying the descriptor 900B to the requesting application program. The software program may also send a command to the memory controller 210 to allocate a buffer of the requested type and size at the base address 904 indicated in the descriptor 900B. The requesting application may use the descriptor ID 910 to identify the descriptor 900B that describes the allocated buffer when accessing the buffer.

As buffers are allocated and deallocated, a multipurpose memory device 20 may experience memory fragmentation. In order to free up larger contiguous portions of memory, the device driver may move buffers around in the multipurpose memory device 20. As buffers are moved, the device driver may update the appropriate descriptors 900B to indicate a new base address 904 for the relocated buffers. Since the owning process for each buffer accesses its buffer by using a descriptor 900B, the buffers may be moved transparently to the owning process, since accessing the descriptor 900B will provide the new base address 904.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note that the section headings used herein are for organizational purposes only and are not meant to limit the description provided herein or the claims attached hereto.

What is claimed is:

1. A graphics system comprising:
   a frame buffer;
   a multipurpose memory;
   a memory controller configured to allocate a texture buffer for storing texture data in the multipurpose memory, to allocate an image buffer for storing image data in the multipurpose memory, to allocate an accumulation buffer for storing accumulation buffer data in the multipurpose memory, wherein the multipurpose memory is configured to have data stored in the image buffer, the texture buffer, and the accumulation buffer at the same time, and wherein at least two of the image buffer, the texture buffer and the accumulation buffer are accessed with different interleaving patterns; and
   a processing device coupled to the frame buffer and the multipurpose memory, wherein the processing device is configured to read texture data, image data, and accumulation buffer data from the texture buffer, image buffer, and accumulation buffer respectively, and to perform texturing operations, image processing operations, and accumulation operations using the texture data, image data, and accumulation buffer data respectively.

2. The graphics system of claim 1, wherein a device driver executing on a host computer is configured to direct the allocation of the image buffer, the texture buffer mid the accumulation buffer with respective sizes as requested by one or more software processes executing on the host computer.

3. The graphics system of claim 1, wherein a device driver executing on a host computer is configured to direct a relocation of buffers including the image buffer, the texture buffer and the accumulation buffer within the address space of the multipurpose memory to reduce memory fragmentation.

4. The graphics system of claim 1, wherein at least two of the image buffer, the texture buffer and the accumulation buffer are configured with different data resolutions.

5. The graphics system of claim 1, wherein at least two of the image buffer, the texture buffer and the accumulation buffer are accessed with different address scrambling techniques.

6. The graphics system of claim 1, wherein the processing device is configured to receive graphics primitives, to apply the texel data from the texture buffer to the graphics primitives, and to store results of said texture application into the frame buffer.

7. The graphics system of claim 6, wherein the processing device is configured to store results of said image processing operations in the image buffer or in the frame buffer.

8. The graphics system of claim 6, wherein the processing device is configured to store results of said accumulation operations in the accumulation buffer or in the frame buffer.

9. The graphics system of claim 1 further comprising a video output processor, wherein the processing device is configured to store pixels in the frame buffer, wherein the video output processor is configured to read said pixels from the frame buffer and generate a video output from said pixels.

10. A graphics system comprising:
    a frame buffer;
    a multipurpose memory;
    a memory controller configured to allocate a texture buffer for storing texture data in the multipurpose memory, to allocate an image buffer for storing image data in the multipurpose memory, to allocate an accumulation buffer for storing accumulation buffer data in the multipurpose memory, wherein the multipurpose memory is configured to have data stored in the image buffer, the texture buffer, and the accumulation buffer at the same time, and wherein at least two of the image buffer, the texture buffer and the accumulation buffer are accessed with different address scrambling techniques; and
    a processing device coupled to the frame buffer and the multipurpose memory, wherein the processing device is configured to read texture data, image data, and accumulation buffer data from the texture buffer, image buffer, and accumulation buffer respectively, and to perform texturing operations, image processing operations, and accumulation operations using the texture data, image data, and accumulation buffer data respectively.

11. The graphics system of claim 10, wherein a device driver executing on a host computer is configured to direct the allocation of the image buffer, the texture buffer and the accumulation buffer with respective sizes as requested by one or more software processes executing on the host computer.

12. The graphics system of claim 10, wherein a device driver executing on a host computer is configured to direct a relocation of buffers including the image buffer, the texture buffer and the accumulation buffer within the address space of the multipurpose memory to reduce memory fragmentation.

13. The graphics system of claim 10, wherein at least two of the image buffer, the texture buffer and the accumulation buffer are configured with different data resolutions.

14. The graphics system of claim 10, wherein the processing device is configured to receive graphics primitives, to apply the texel data from the texture buffer to the graphics primitives, and to store results of said texture application into the frame buffer.

15. The graphics system of claim 14, wherein the processing device is configured to store results of said image processing operations in the image buffer or in the frame buffer.

16. The graphics system of claim 14, wherein the processing device is configured to store results of said accumulation operations in the accumulation buffer or in the frame buffer.

17. The graphics system of claim 10, further comprising a video output processor, wherein the processing device is configured to store pixels in the frame buffer, wherein the video output processor is configured to read said pixels from the frame buffet and generate a video output from said pixels.

* * * * *

UNITED STATES PATENT AND TRADEMARK OFFICE
CERTIFICATE OF CORRECTION

PATENT NO. : 6,906,720 B2
DATED : June 14, 2005
INVENTOR(S) : Emberling et al.

It is certified that error appears in the above-identified patent and that said Letters Patent is hereby corrected as shown below:

Column 13,
Line 37, please delete "buffer mid the" and substitute -- buffer and the --.

Signed and Sealed this

Fourth Day of October, 2005

JON W. DUDAS
*Director of the United States Patent and Trademark Office*